J. A. LAWLER.
NUMBER HOLDER FOR AUTOMOBILES.
APPLICATION FILED JUNE 28, 1918.
1,300,743.
Patented Apr. 15, 1919.
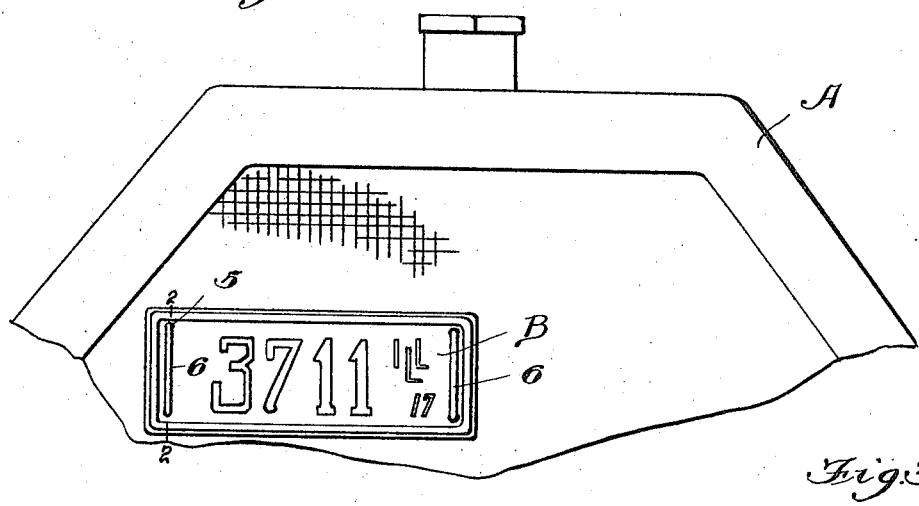
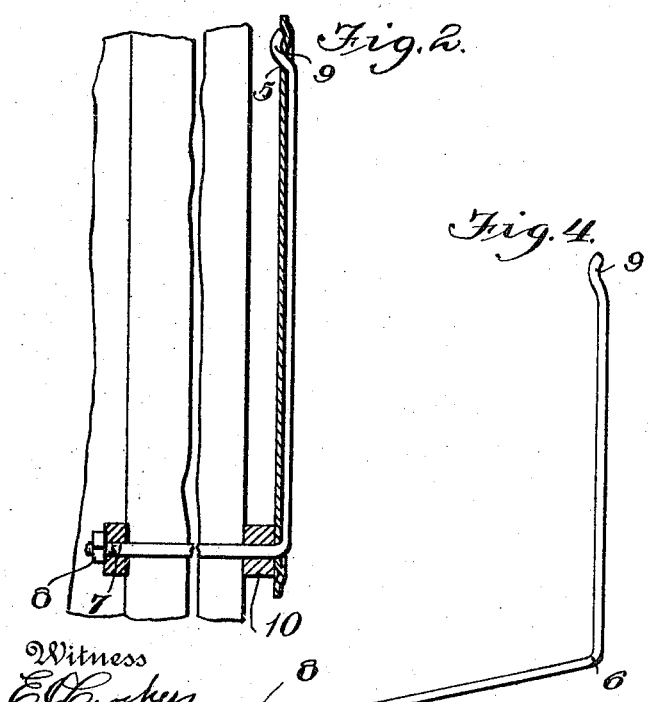
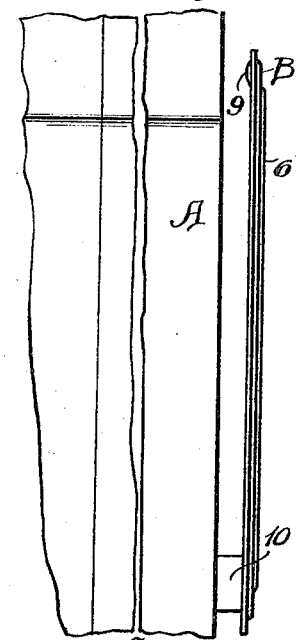
Inventor
J. A. Lawler

UNITED STATES PATENT OFFICE.

JAMES A. LAWLER, OF RUSHVILLE, ILLINOIS.

NUMBER-HOLDER FOR AUTOMOBILES.

1,300,743.   Specification of Letters Patent.   Patented Apr. 15, 1919.

Application filed June 28, 1918. Serial No. 242,433.

*To all whom it may concern:*

Be it known that I, JAMES A. LAWLER, a citizen of the United States, residing at Rushville, in the county of Schuyler, State of Illinois, have invented certain new and useful Improvements in Number-Holders for Automobiles; and I do hereby declare the following to be a full, clear, and exact description of the invention, such as will enable others skilled in the art to which it appertains to make and use the same.

The invention relates to a bracket and more particularly to the class of license plate holders for use on automobiles.

The primary object of the invention is, the provision of a holder of this character wherein the number or license plate can be firmly held in position so it is readily visible upon an automobile, the holder being of novel form to support the plate and to avoid rattling thereof, or accidental loss of the same.

Another object of the invention is the provision of a holder of this character, which is extremely simple in construction, enables the easy mounting of the number or license plate upon the radiator or other part of the automobile, also inexpensive to manufacture.

With these and other objects in view, the invention consists in the features of construction, combination and arrangement of parts as will be hereinafter fully described, illustrated in the accompanying drawing and pointed out in the claim hereunto appended.

In the accompanying drawing:

Figure 1, is an elevation at the radiator or front end of the automobile showing the license plate supported in accordance with the invention.

Fig. 2, is a sectional view on the line 2—2 of Fig. 1.

Fig. 3, is a side elevation.

Fig. 4, is a perspective view of one of the brackets of the holder.

Similar reference characters indicate corresponding parts throughout the several views in the drawing.

Referring to the drawing in detail, A, designates generally the radiator of an automobile which is of any well known construction and B the license or number plate, which in this instance has formed in the four corners, holes or openings 5, for the mounting of the plate on a holder hereinafter fully described.

The holder comprises a pair of L-shaped brackets 6 each formed from a single length of rigid wire bent to provide the vertical and horizontal arms, each horizontal arm being formed with a threaded end portion 7 for receiving an adjustable nut 8 for the fastening of this arm in the radiator A, in a manner presently described.

Formed on the vertical arm of the bracket 6 is a hook end 9 for the fastening of the license or number plate B on the bracket.

In the use of the brackets 6, each is first engaged with the license or number plate B by inserting the hook end 9 in the uppermost corner hole 5 in said plate and then passing the horizontal arm of said bracket through the lower corner hole 5 in said plate, the nut 8 being removed from the threaded end 7 of the bracket and thereafter the horizontal arm is passed transversely through the body of the radiator A and fastened thereto by engaging the nut 8 on the threaded end 7 of the bracket 6, and disposed against the front and rear faces of the radiator A are blocks 10 which space the license or number plate B from the radiator, and also against which are tightened the nuts 8, thus firmly and securely fastening the number or license plate in position upon the radiator.

It is of course understood that the bracket 6 can be mounted either at the lower portion or at the upper portion of the radiator A, or can be secured in the body of the automobile at the rear thereof and this is contemplated and within the scope of the present invention.

From the foregoing, it is thought that the construction and manner of use of the license or number plate is clearly understood and therefore a more extended explanation has been omitted.

What is claimed is:

The combination with a license plate having pairs of openings therethrough, of a pair of brackets each including an arm disposed across the plate and having a terminal hook at one end engaged in an opening of a corresponding pair and an arm extending from the other end of the first named arm through the other opening of the same pair and beyond the plate, where it is adapted for engagement with a support.

In testimony whereof, I affix my signature, in the presence of two witnesses.

JAMES A. LAWLER.

Witnesses:
R. A. LAWLER,
HARRIETT HOUSTON.